(12) United States Patent
Seo et al.

(10) Patent No.: US 8,412,037 B2
(45) Date of Patent: Apr. 2, 2013

(54) IMAGE PHOTOGRAPHING APPARATUS AND METHOD OF CONTROLLING THE SAME

(75) Inventors: Kyung Yul Seo, Iksan-si (KR); In Ho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 12/778,277

(22) Filed: May 12, 2010

(65) Prior Publication Data

US 2010/0296806 A1 Nov. 25, 2010

(30) Foreign Application Priority Data

May 25, 2009 (KR) ........................ 10-2009-0045282

(51) Int. Cl.
*G03B 17/18* (2006.01)
*G06F 3/048* (2006.01)

(52) U.S. Cl. ....................................... 396/290; 715/833

(58) Field of Classification Search .......... 396/290–292, 396/236; 715/833
See application file for complete search history.

(56) References Cited

U.S. PATENT DOCUMENTS

| | | | | |
|---|---|---|---|---|
| 5,289,216 A | * | 2/1994 | Ohsawa et al. | 396/207 |
| 5,333,030 A | * | 7/1994 | Kikukawa et al. | 396/303 |
| 2009/0265664 A1 | * | 10/2009 | Shin | 715/810 |

\* cited by examiner

*Primary Examiner* — Clayton E LaBalle
*Assistant Examiner* — Noam Reisner
(74) *Attorney, Agent, or Firm* — Stanzione & Kim, LLP

(57) ABSTRACT

A method of controlling an image photographing apparatus includes checking a photographing mode of the image photographing apparatus, displaying a characteristic curve indicating a relationship between photographing conditions and a recommended region if the checked photographing mode is a manual mode to manually adjust the photographing conditions, and changing the photographing conditions if a user specifies any point of the characteristic curve or the periphery of the characteristic curve. Accordingly, it may be possible to implement the user interface which is conveniently and easily controlled.

31 Claims, 14 Drawing Sheets

| PHOTOGRAPHING MODE | AUTO | PROGRAM | IRIS | SHUTTER | MANUAL |
|---|---|---|---|---|---|
| ICON |  |  |  |  |  |
| PHOTOGRAPHING MODE | MySET | VOICE RECORDING | MOVING IMAGE | SCENE PHOTOGRAPHING | |
| ICON |  |  |  | SCENE | |

IMAGE PHOTOGRAPHING APPARATUS AND METHOD OF CONTROLLING THE SAME

CROSS-REFERENCE TO RELATED APPLICATIONS

This application claims priority under 35 U.S.C. §119 of Korean Patent Application No. 2009-0045282, filed on May 25, 2009 in the Korean Intellectual Property Office, the disclosure of which is incorporated herein by reference in its entirety.

BACKGROUND

1. Field of the Invention

Embodiments of the present general inventive concept relate to an image photographing apparatus including a user interface to adjust a photographing condition, and a method of controlling the same.

2. Description of the Related Art

Generally, an image photographing apparatus such as a camcorder or a camera includes a shutter and an iris as indispensable components. In the image photographing apparatus, exposure needs to be properly adjusted according to the driving states of the shutter and the iris. Meanwhile, the shutter controls the time of exposure of a film to light, and the iris controls an opening area and a depth of focus. A product of the time of exposure and the opening area is an Exposure Value (EV), and the depth of focus is inversely proportional to the opening area. In some cameras, a user may arbitrarily adjust the states of the shutter and the iris. However, technology of automatically adjusting the states of the shutter and the iris using electronic elements has come into wide use.

The mode of an automatic exposure apparatus may be divided into a program mode, an aperture mode or an iris mode, and a shutter mode, and each mode may provide a different method of adjusting the relationship between the iris and the shutter. In the iris mode, the opening area of the iris is first set and the traveling speed of the shutter is then set. In contrast, in the shutter mode, the traveling speed of the shutter is first set and the opening area of the iris is then set. In the program mode, since the shutter and the iris are interlocked, both the shutter and the iris need to be finely adjusted.

In the conventional automatic exposure apparatus, since both the iris and the shutter are separately included in the program mode, the iris mode or the shutter mode, the number of parts of the camera is large and a mechanism for mechanically adjusting the iris and the shutter becomes complicated. In the program mode, since the iris and the shutter are interlocked and need to be controlled with high precision, an operation to obtain a proper exposure state becomes complicated.

SUMMARY

Therefore, it is an aspect of the present general inventive concept to provide an image photographing apparatus to specify any point of a characteristic curve indicating a relationship between photographic conditions or the periphery of the characteristic curve so as to change the photographic conditions, and a method of controlling the same.

Additional aspects of the present general inventive concept will be set forth in part in the description which follows and, in part, will be obvious from the description, or may be learned by practice of the general inventive concept.

Features and/or utilities of the present general inventive concept may be realized by a method of controlling an image photographing apparatus that includes checking a photographing mode of the image photographing apparatus, displaying a characteristic curve indicating a relationship between photographing conditions if the photographing mode is a manual mode, and specifying any point on the display and changing the photographing conditions.

A recommended region indicating a photographing condition region recommended when performing a photographing operation of the image photographing apparatus may be displayed at the periphery of the characteristic curve.

The photographing conditions may include a shutter speed, an iris value, or an International Organization for Standardization (ISO) value.

The characteristic curve may include a curve displayed in an internal space formed by a horizontal axis and a vertical axis, and a value of the horizontal axis or the vertical axis may be set to any one of the shutter speed, the iris value, or the ISO value by touching the display or controlling an input button included in the image photographing apparatus.

Any one of the shutter speed, the iris value or the ISO value, which is not set as the value of the horizontal axis or the vertical axis, may be used as a default of the characteristic curve.

The default may be displayed on one side of the display, and may be set to any value by touching the display or controlling the input button.

The specifying of any point on the display may include specifying any point on the horizontal axis or the vertical axis.

When any point on any one of the horizontal axis or the vertical axis is specified, the photographing condition of the non-specified axis may be changed according to the characteristic curve.

The specifying of any point on the display may include specifying any point on the characteristic curve.

When any point on the characteristic curve is specified, the photographing conditions of the horizontal axis and the vertical axis may be changed according to the specified point.

The specifying of any point on the display may include specifying any point on the internal space formed by the horizontal axis and the vertical axis.

The photographing conditions of the horizontal axis and the vertical axis may be changed according to the point specified on the internal space.

When the point specified on the internal space is outside the recommended region, Exposure Value Compensation (EVC) may be displayed on the display.

The characteristic curve may be updated and displayed at a predetermined interval of time.

The characteristic curve may be updated and displayed when a screen photographed by the image photographing apparatus is changed.

The changing of the screen may include changing a Field of View (FOV) of the image photographing apparatus or changing a scene photographed by the image photographing apparatus.

Features and/or utilities of the present general inventive concept may also be realized by an image photographing apparatus that includes a display to display a characteristic curve indicating a relationship between photographing conditions, and a controller to change the photographing conditions according to the specified point when any point on the display is specified.

The display may update and display the characteristic curve at a predetermined interval of time.

The display may update and display the characteristic curve when a screen photographed by the image photographing apparatus is changed.

The changing of the screen may include changing of a Field of View (FOV) of the image photographing apparatus or changing of a scene photographed by the image photographing apparatus.

The display may display the characteristic curve superimposed on a screen photographed by the image photographing apparatus or solely display the characteristic curve.

The display may include a touch screen to allow a user to touch a screen to input a command.

The photographing conditions may include a shutter speed, an iris value, or an International Organization for Standardization (ISO) value.

The characteristic curve may include a curve displayed in an internal space formed by a horizontal axis and a vertical axis, and a value of the horizontal axis or the vertical axis may be set to any one of the shutter speed, the iris value, or the ISO value.

When any point on the horizontal axis or the vertical axis is specified, the controller may also change the photographing condition of the non-specified axis according to the characteristic curve.

A recommended region indicating a photographing condition region recommended when performing a photographing operation of the image photographing apparatus may be displayed at the periphery of the characteristic curve.

When any point on the characteristic curve is specified, the controller may change the photographing conditions of the horizontal axis and the vertical axis according to the specified point.

When any point of the periphery of the characteristic curve is specified, the controller may change the photographing conditions of the horizontal axis and the vertical axis according to the specified point.

When any point outside the recommended region is specified, the controller may display an Exposure Value Compensation (EVC) on the display.

The image photographing apparatus may further include an input button to specify any point on the display or input a command to the controller.

According to an embodiment of the present general inventive concept, any point of the characteristic curve or the periphery of the characteristic curve displayed on the display may be specified so as to easily change the photographing conditions.

Features and/or utilities of the present general inventive concept may be realized by a method of controlling an image-capture device, the method including displaying a graph including a characteristic curve representing a relationship between at least two image-capture characteristics and adjusting at least one of the image-capture characteristics in response to a user input corresponding to a location on the graph.

The image-capture characteristics may include at least one of a shutter speed, an iris aperture, and an International Organization of Standardization (ISO) value.

The user input may be received on any one of an axis of the graph, the characteristic curve of the graph, or a peripheral portion of the graph not including an axis or the characteristic curve.

The method may include, when a user input is received at a location corresponding to a first axis of the graph, adjusting a value of the image-capture characteristic of the first axis to correspond to the user input and adjusting a value of the image-capture characteristic of a second axis to correspond to the user input.

The method may include, when a user input is received at a location corresponding to a first axis of the graph, highlighting on a display a portion of the first axis corresponding to the location of the user input.

The method may include, when a user input is received at a location corresponding to a characteristic curve of the graph, adjusting values of the image-capture characteristics of first and second axes of the graph to correspond to the location of the user input.

The method may include, when a user input is received at a location corresponding to a peripheral portion of the graph, determining whether the user input location corresponds to an image-capture characteristic value of each of a first image capture characteristic corresponding to a first axis of the graph and a second image capture characteristic corresponding to a second axis of the graph within a predetermined range of the image-capture characteristic values defined by the characteristic curve.

When it is determined that the user input location corresponds to image-capture characteristics within a predetermined range of the image-capture characteristic values defined by the characteristic curve, the method may include only adjusting the first and second image-capture characteristic values to correspond to the user input location.

The method may further include, when it is determined that the user input location corresponds to image-capture characteristics outside a predetermined range of the image-capture characteristic values defined by the characteristic curve, generating a new characteristic curve to include the user input location.

The method may further include displaying on the graph a symbol corresponding to the location of the user input.

The method may further include displaying a captured image simultaneously with displaying the graph.

The method may further include adjusting the displayed captured image to correspond to the adjusted at least one image-capture characteristic.

The method may further include displaying the adjusted captured image for a predetermined period of time after adjusting the captured image.

Features and/or utilities of the present general inventive concept may also be realized by a method of controlling an image-capture device, the method including displaying a graph including a characteristic curve representing a relationship between at least two image-capture characteristics, selecting a location on the graph, and adjusting at least one of the image-capture characteristics in response to the selected location.

Features and/or utilities of the present general inventive concept may also be realized by a method of controlling an image-capture device, the method including displaying a graph including a characteristic curve representing a relationship between at least two image-capture characteristics, detecting a user input selecting a location on the graph, and adjusting at least one of the image-capture characteristics to correspond to the selected location.

Features and/or utilities of the present general inventive concept may also be realized by an image-capture apparatus, including a display to display a graph including a characteristic curve representing a relationship between at least two image-capture characteristics, and a controller to detect an input corresponding to a location on the graph, to adjust at least one of the image-capture characteristics corresponding to the location on the graph.

The controller may update the displayed graph to correspond to the input location.

The display may display a captured image and update the displayed image corresponding to the input location.

When at least one of the image-capture characteristics is shutter speed, the controller may adjust the shutter speed of the image-capture apparatus to correspond to the input location.

When at least one of the image-capture characteristics is iris aperture, the controller may adjust an iris aperture size of the image-capture apparatus to correspond to the input location.

The display may be a touch-screen display, and the user input may be receivable via the touch-screen display.

The image-capture apparatus further may include at least one input device to receive the user input.

The at least one input device may be at least one of a button, a knob, and a dial.

Features and/or utilities of the present general inventive concept may also be realized by a computer-readable medium having stored code to execute a method, the method including displaying a graph including a characteristic curve representing a relationship between at least two image-capture characteristics and adjusting at least one of the image-capture characteristics in response to a user input corresponding to a location on the graph.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE EMBODIMENTS

Figure 1:
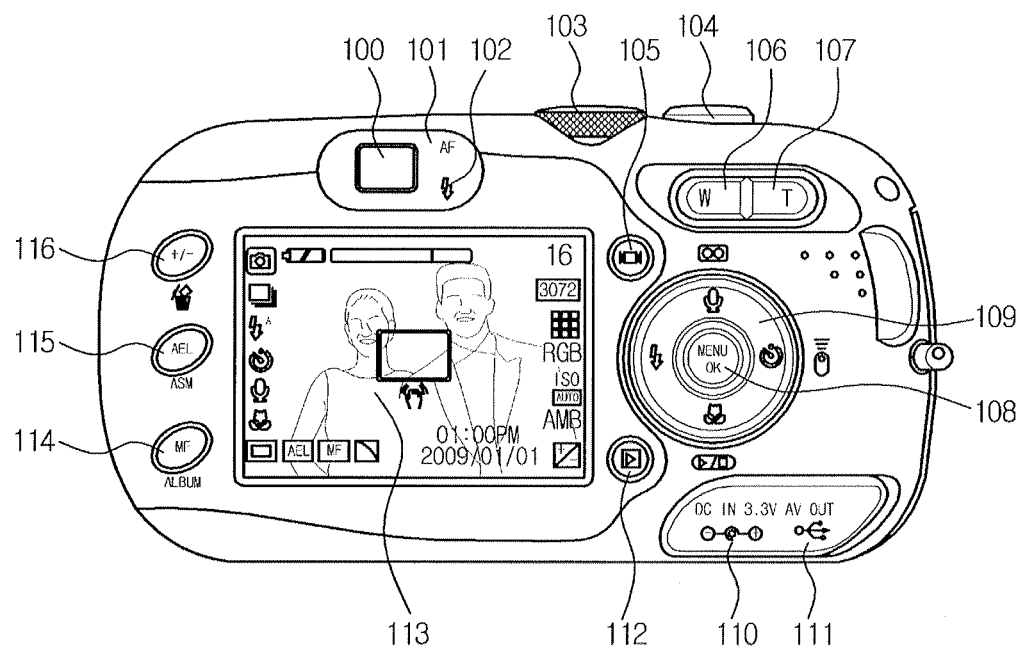
FIG. 1 is a view showing a rear side of an image photographing apparatus according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a view showing a rear side of an image photographing apparatus according to an embodiment of the present general inventive concept.

As illustrated in FIG. 1, the rear side of the image photographing apparatus 10 may include a viewfinder 100 to output a screen for focusing, an automatic focusing lamp 101 which is switched on when an image is focused, a flash state lamp 102 to display a flash state, a mode dial 103 to select a manual mode or an auto mode, a shutter button 104 to open a shutter, a display button 105 to turn on/off a display screen, a wide angle zoom button 106 to enlarge a narrow space and exaggerate perspective, a telephoto zoom button 107 to enlarge a distant object, a menu/OK button 108 to select a menu or OK, a direction/function button 109 including the menu/OK button and up, down, left and right buttons to perform special functions when the menu is displayed on a display 113, a DC power supply terminal 110 to supply power, an external output terminal 111 to externally output the screen of the image photographing apparatus 10, a playback mode button 112 to change a mode so as to play back the photographed screen on the display 113, the display 113 (On-Screen Display (OSD)) to display a state and a photographing mode which is currently set in the image photographing apparatus 10, a manual focusing button 114 to change a mode so as to allow a user to manually perform focusing, an auto exposure lock button 115 to fix an Exposure Value (EV) of the image photographing apparatus 10, a photographing quality adjustment button 116 to manually adjust the quality of a photographed screen, and the like are provided.

The various function buttons shown in FIG. 1 may perform two or more functions in addition to the functions indicated by the names thereof, according to the types of the image photographing apparatus 10. For example, the output 111 may output electronically stored photographs, the direction button 109 may be used to select points or locations on an image displayed on the display 113, and any of the above-described buttons may be located on any side of the photographing apparatus 10.

Figure 2A:
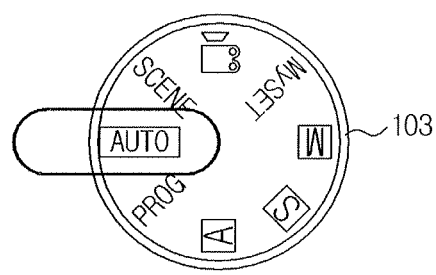
FIG. 2A is a view showing a screen displayed on a display when a mode dial is set, according to the embodiment of the present general inventive concept.
Figure 2A:
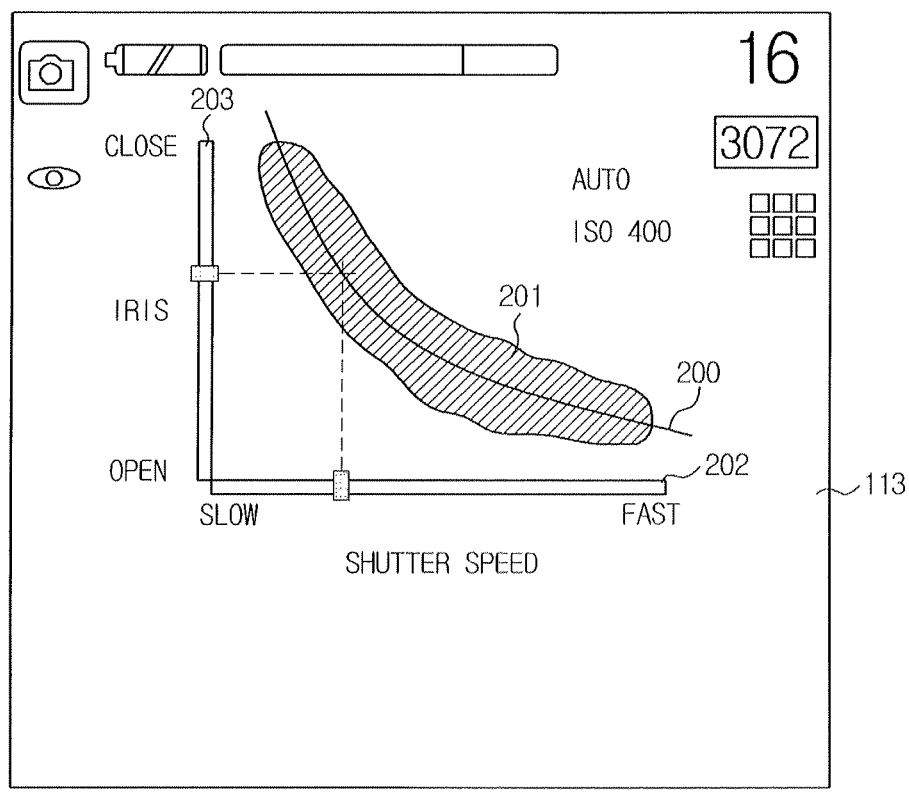

FIG. 2A is a view showing the screen displayed on the display when the mode dial is set, according to an embodiment of the present general inventive concept.

As illustrated in FIG. 2A, when the mode dial 103 of the image photographing apparatus 10 is set to the auto mode, a graph is displayed on the display 113 that includes a characteristic curve 200 and a recommended region 201. The auto mode automatically adjusts the photographing conditions in the image photographing apparatus 10. The photographing conditions are not arbitrarily adjusted by the user.

In the specification and claims, the term "photographing conditions" refers to any characteristics of the image-capture device, such as the photographing apparatus 10, that may be adjusted by a user or automatically by the image-capture device to affect an image-capture process. In other words, photographing conditions or characteristics are properties of an image-capture device and not general conditions, such as environmental conditions, that are not controlled by the image-capture device to control an image-capture operation.

In the characteristic curve 200, a relationship between a shutter speed, an iris value, and an International Organization for Standardization (ISO) value is displayed on a two-dimensional space using a graphic. The characteristic curve 200 indicating the relationship between the photographing conditions is displayed on an internal space formed by a horizontal axis 202 and a vertical axis 203 so as to provide a convenient user interface to the user.

The recommended region 201 of the characteristic curve 200 indicates the periphery of the characteristic curve 200, that is, a predetermined region having an optimal EV.

If the photographing mode of the image photographing apparatus 10 is the auto mode, the user does not manually change the photographing condition and the characteristic curve 200 indicating the relationship between the current photographing conditions is displayed on the display 113 in a state of being dimmed.

Figure 2B:
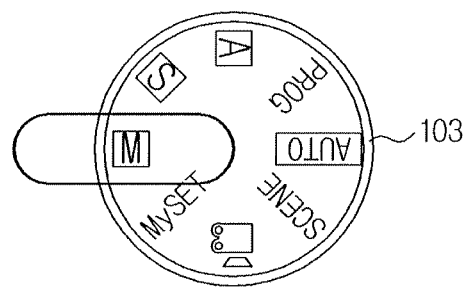
FIG. 2B is a view showing a screen displayed on a display when a mode dial is set, according to the embodiment of the present general inventive concept.
Figure 2B:
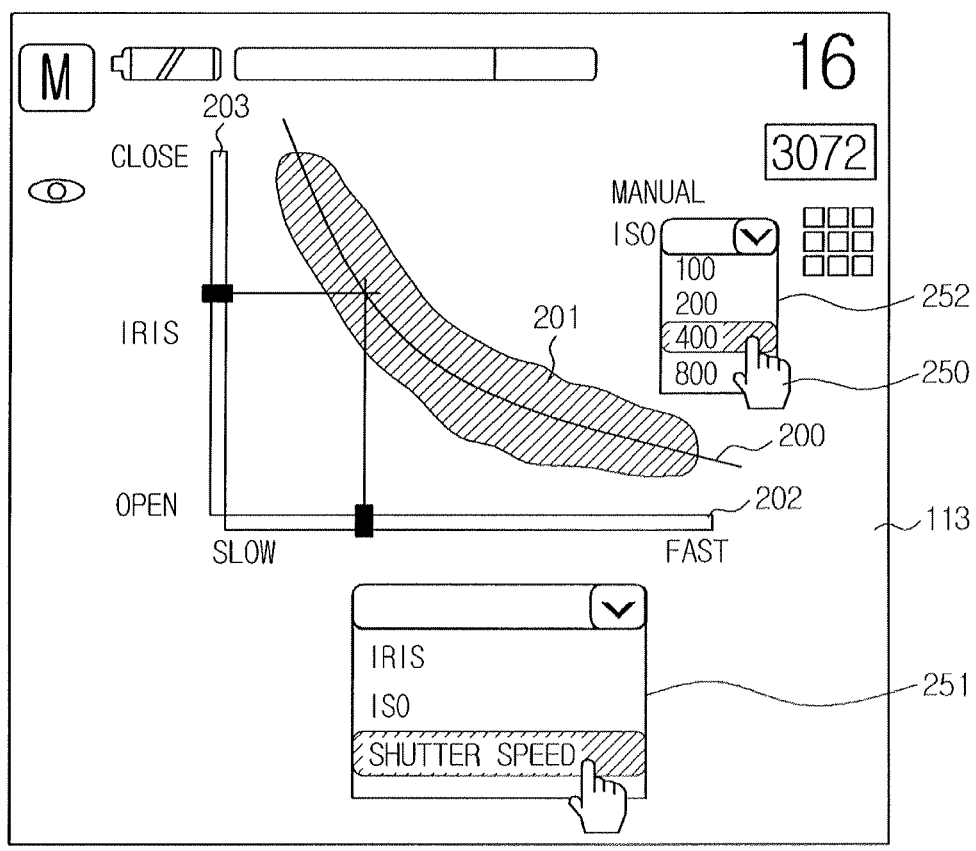

FIG. 2B is a view showing the screen displayed on the display when the mode dial is set, according to an embodiment of the present general inventive concept.

As illustrated in FIG. 2B, when the mode dial 103 of the image photographing apparatus 10 is set to the manual mode, a graph is displayed on the display 113 that includes the characteristic curve 200 and the recommended region 201. In the manual mode, the photographing conditions of the image photographing apparatus 10 are manually set by the user. When the user touches the display 113 or presses the function button 109, the value indicated by the horizontal axis 202 or the vertical axis 203 of the characteristic curve 200 may be set to any one of the shutter speed, the iris value or the ISO value. The kind and the value of a default displayed on one side of the display 113 may be set when the user touches the display 113 or presses the function button 109. For example, in FIG. 2B, the horizontal axis 202 of the characteristic curve 200 denotes the shutter speed, the vertical axis 204 denotes the iris value, and the default is the ISO value. In FIG. 2B, the characteristic curve 200 representing the optimal iris value according to the change in shutter speed when the ISO value is used as the default is displayed on the display 113.

A selection icon 250 may be generated on the screen 113 to select values of one or more menus or of the curve 200 or any other portion of the graph, including the recommended region 201 the axes 202, 203, or any portion of the graph defined by the axes 202, 203. FIG. 2B illustrates the selection icon 250 selecting a shutter speed photographing characteristic from a menu 251, and a value "400" from a Manual ISO menu 252.

FIG. 2B is different from FIG. 2A in that the screen of the characteristic curve 200 displayed on the display 113 is boldly displayed such that the user institutively knows that the photographing conditions may be manually adjusted.

Figure 2C:
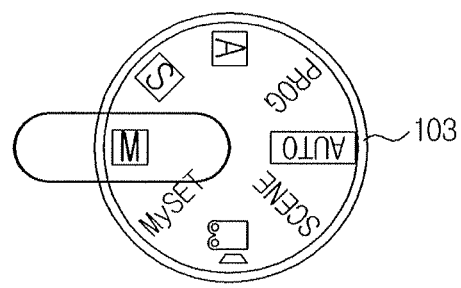
FIG. 2C is a view showing a screen displayed on a display when a mode dial is set, according to the embodiment of the present general inventive concept.
Figure 2C:
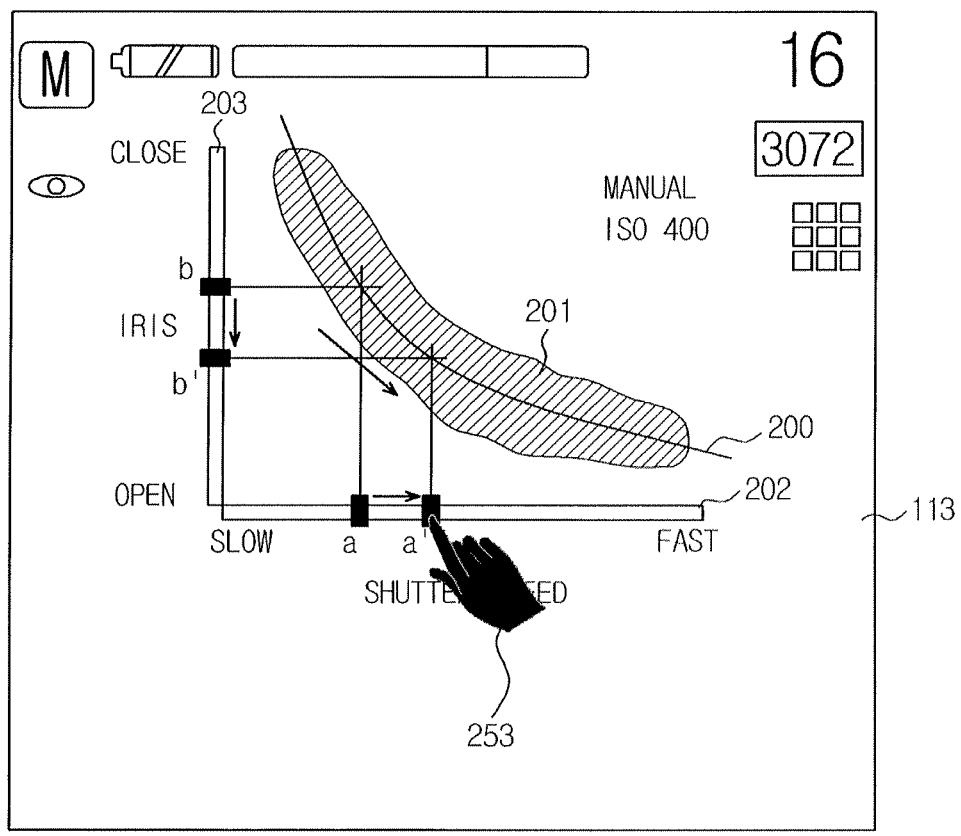

FIG. 2C is a view showing the screen displayed on the display when the mode dial is set, according to an embodiment of the present general inventive concept.

As illustrated in FIG. 2C, when the user (represented by the hand symbol 253) specifies any point on one of the horizontal axis 202 or the vertical axis 203 of the characteristic curve 200 in the manual mode, a point on the other axis corresponding thereto is changed according to the characteristic curve 200. For example, in FIG. 2C, when the user specifies a value a' as the shutter speed of the horizontal axis 202 of the characteristic curve 200, the iris value of the vertical axis 203 of the characteristic curve 200 is changed to a value b' corresponding thereto. When the user specifies the value b' as the iris value of the vertical axis 203 of the characteristic curve 200, the shutter speed of the horizontal axis 202 of the characteristic curve 200 is changed to the value a' corresponding thereto.

A point along either axis 202, 203 may be selected by touching the point or by dragging a value marker to the point. For example, in FIG. 2C, if the screen 113 is a touch screen, a user may touch the point on the axis 202 corresponding to the value a' and the shutter speed will automatically adjust to the shutter speed value a' and the iris value b' on the curve 200 that corresponds to the shutter speed value a'. Alternatively, a user may touch the shutter speed axis 202 at the point corresponding to the first shutter speed value "a" and drag the value marker to the point corresponding to the shutter speed value a'. As the user drags the value marker, the value of the iris may also change to include values between b and b' to give a visual impression that dragging the shutter speed value marker from the value "a" to the value a' also drags the iris value marker from the value "b" to the value b'. Although an example has been described that utilizes a touch screen, any method may be used to select points on the screen 113, including buttons, knobs, dials, or an external input device.

The term "dragging" generally refers to making a selection input and keeping the selection input selected while changing a position of a selection marker on a screen. On a touch screen, "dragging" the selection icon 250 may include touching the screen with a finger and moving the finger to another point on the screen without lifting the finger. With other input devices, "dragging" may include pressing a "selection" button and keeping the button pressed while moving a selection icon on a screen. Alternatively, a "selection" button may be pressed and released one or more times to enter a "drag" mode. A selection icon may then be moved on the screen. The "selection" button may be pressed again one or more times to exit the "drag" mode and complete the dragging function. A digitally-generated selection marker may not be necessary to complete a drag function, particularly on a touch screen where a user's finger may act as the selection marker.

Figure 2D:
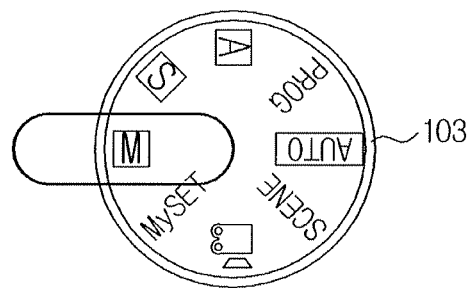
FIG. 2D is a view showing a screen displayed on a display when a mode dial is set, according to the embodiment of the present general inventive concept.
Figure 2D:
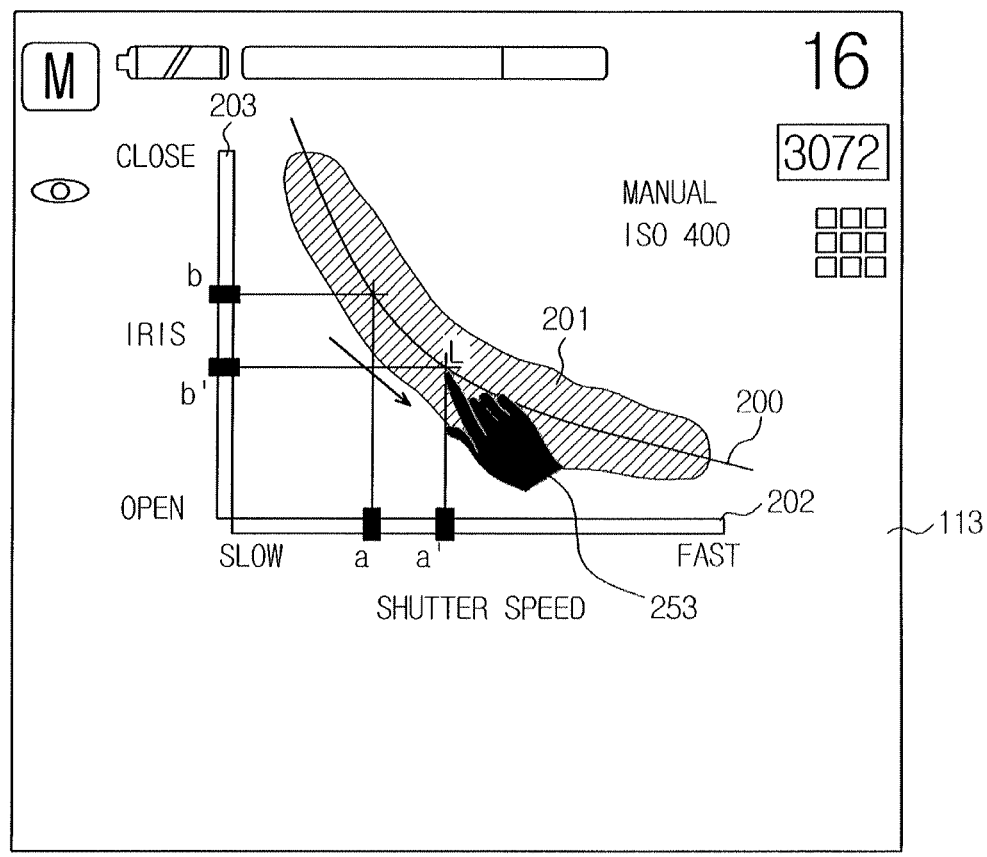

FIG. 2D is a view illustrating the screen displayed on the display when the mode dial is set, according to the embodiment of the present general inventive concept.

As illustrated in FIG. 2D, when the user specifies any point on the characteristic curve 200 in the manual mode, the photographing conditions of the horizontal axis 202 and the vertical axis 203 of the characteristic curve 200 are changed to the values indicated by the specified point. For example, in FIG. 2D, when the user specifies a point L on the characteristic curve 200, the shutter speed of the horizontal axis 202 of the characteristic curve 200 is changed from the value a to the value a', and the iris value of the vertical axis 203 of the characteristic curve 200 is changed from the value b to the value b'.

As described above with reference to FIG. 2C, any point along the curve 200 may be selected by touching the point or by dragging a value marker to the point. For example, in FIG. 2D, if the screen 113 is a touch screen, a user may touch the point on the curve 200 corresponding to the value a' and the shutter speed will automatically adjust to the shutter speed value a' and the iris value b' on the curve 200 that corresponds to the shutter speed value a'. Alternatively, a user may touch the curve 200 at the point corresponding to the first shutter speed value "a" and drag the value marker to the point corresponding to the shutter speed value a'. As the user drags the value marker, the value of the iris may also change to include values between b and b' to give a visual impression that dragging the shutter speed value marker from the value "a" to the value a' also drags the iris value marker from the value "b" to the value b'. Although an example has been described that utilizes a touch screen, any method may be used to select points on the screen 113, including buttons, knobs, dials, or an external input device.

Figure 2E:
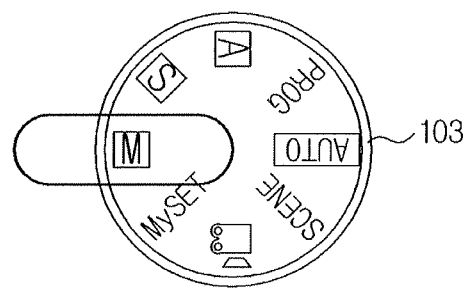
FIG. 2E is a view showing a screen displayed on a display when a mode dial is set, according to the embodiment of the present general inventive concept.
Figure 2E:
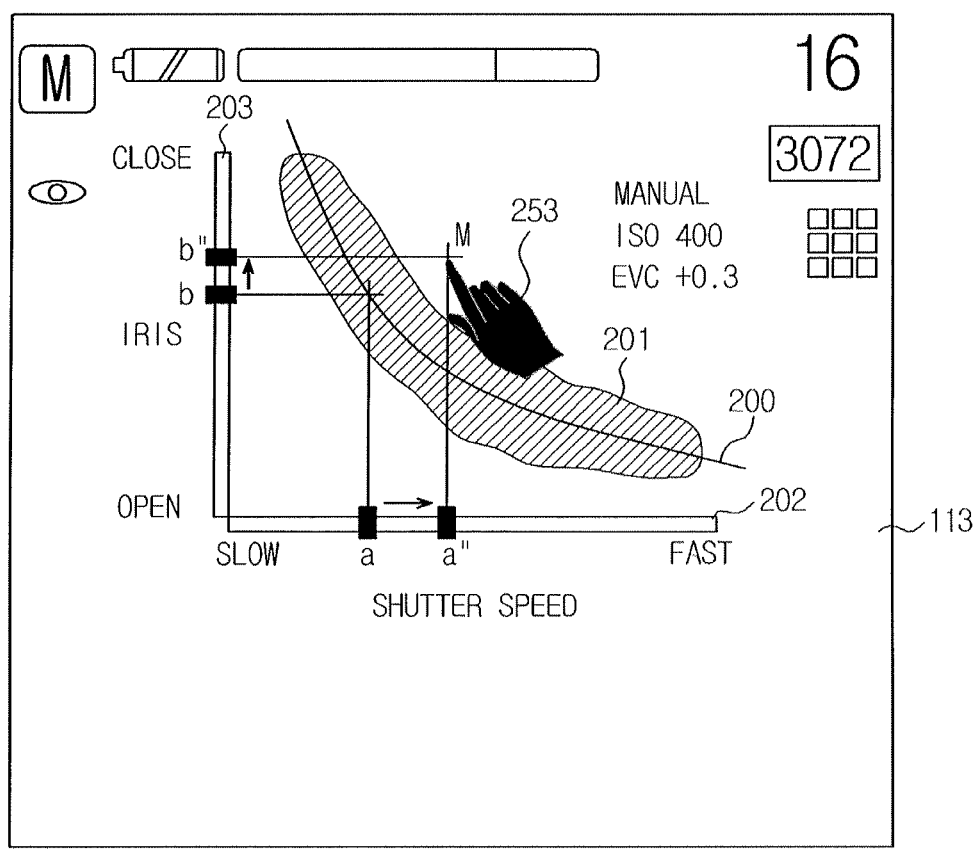

FIG. 2E is a view illustrating the screen displayed on the display when the mode dial is set, according to an embodiment of the present general inventive concept.

As illustrated in FIG. 2E, when the user specifies any point of the internal space formed by the horizontal axis 202 and the vertical axis 203 of the characteristic curve 200, the photographing conditions of the horizontal axis 202 and the vertical axis 203 corresponding to the specified point are changed. For example, in FIG. 2E, when the user specifies a point M, the shutter speed of the horizontal axis 202 of the characteristic curve 200 is changed from the value a to a value a", and the iris value of the vertical axis 203 of the characteristic curve 200 is changed from the value b to a value b". In FIG. 2E, when the user specifies any point outside the recommended region 202 of the characteristic region 200, Exposure Value Compensation (EVC) is additionally displayed on the display.

EVC refers to a value to increase or decrease an Auto Exposure (AE) target level to a brightness level (recommended region level) desired by the user. EVC is obtained by the following equation.

$$EV = \log_2(N^2 * (1/T) * (100/ISO))$$

where, N denotes an F-number (indicating the brightness of the lens), T denotes the shutter speed, and ISO denotes the ISO gain.

Figure 2F:
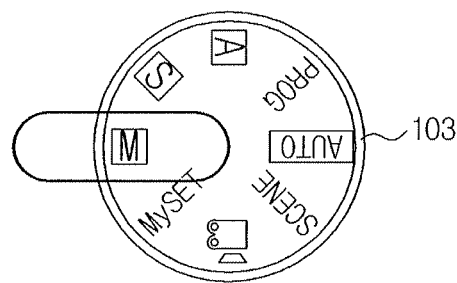
FIG. 2F is a view showing a screen displayed on a display when a mode dial is set, according to the embodiment of the present general inventive concept.
Figure 2F:
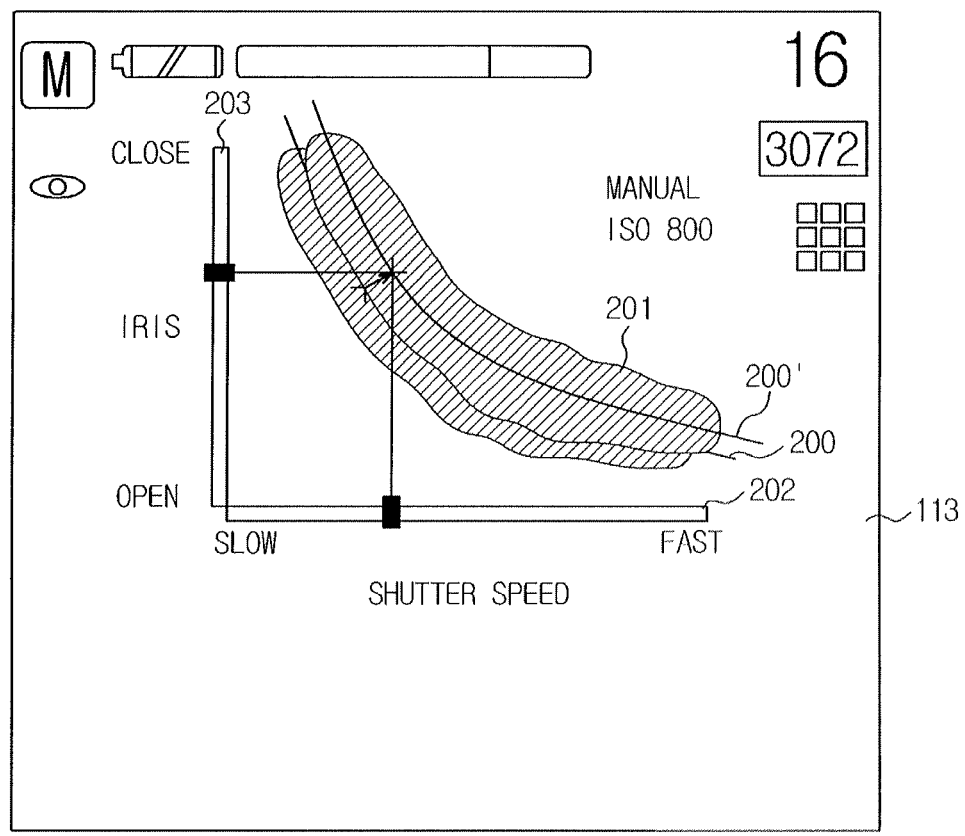

FIG. 2F is a view illustrating the screen displayed on the display when the mode dial 103 is set to "manual," according to an embodiment of the present general inventive concept.

As illustrated in FIG. 2F, when the user changes the default value of the characteristic curve 200, the characteristic curve 200 and the recommended region 201 corresponding to the changed default value are updated accordingly. For example, in FIG. 2F, if the ISO value is changed from 400 to 800, the characteristic curve 1 (200) is updated to the characteristic curve 2 (200') and the characteristic curve 2 (200') is displayed.

Figure 2G:
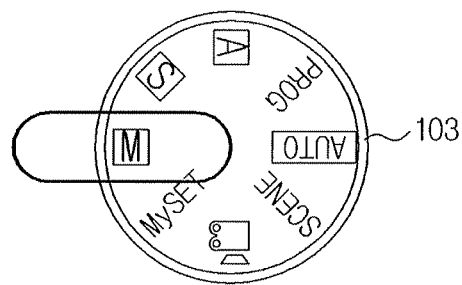
FIG. 2G is a view showing a screen displayed on a display when a mode dial is set, according to the embodiment of the present general inventive concept.
Figure 2G:
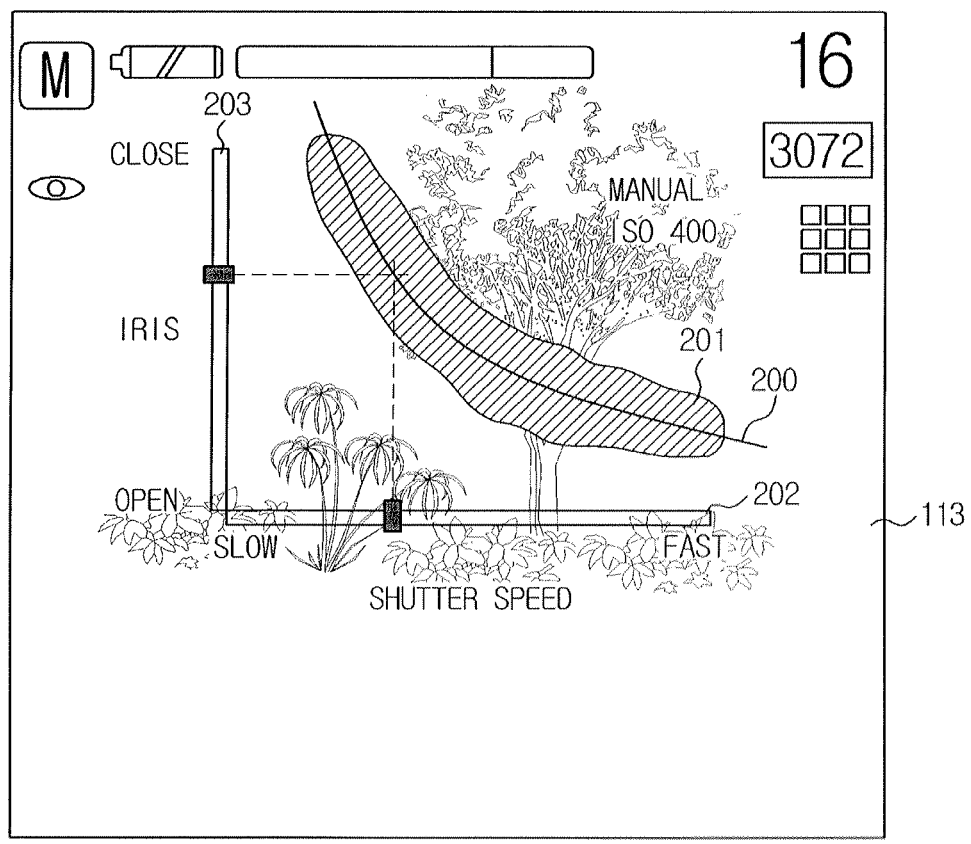

FIG. 2G is a view illustrating the screen displayed on the display when the mode dial 103 is set to "manual," according to an embodiment of the present general inventive concept.

As illustrated in FIG. 2G, an image corresponding to a graph including the characteristic curve 200 and the recommended region 201 may be displayed on the display superimposed on an input image. When the user specifies any point of the characteristic curve 200 or the periphery of the characteristic curve 200 so as to change the photographing conditions, the input image according to the changed photographing conditions is displayed on the screen and thus the user may intuitively select a desired EV.

The graph may be displayed constantly when a predetermined mode, such as the manual mode, is selected, or the graph may be displayed only at predetermined times and for predetermined periods of time. For example, the display 113 may display only the captured image until a user changes an operating mode from "auto" to "manual." The graph including the characteristic curve 200 may then be generated on the screen. The graph may be generated for a predetermined period of time, such as 10 second, after which the graph may be removed from the screen if the user has not adjusted image-capture characteristics. In addition, if the graph is not on the screen, a user may touch any portion of the screen, an icon on the screen, or a button to generate the graph on the screen to adjust the image-capture characteristics.

After the user adjusts the image-capture characteristics, the screen 113 may display an adjusted image including the graph for a predetermined period of time, such as 10 seconds, after with the graph may be removed. Alternatively, the graph may be minimized in one corner or side of the screen 113.

In an image-capture device including a view-finder and a screen, such as the image photographing apparatus of FIG. 1, only the graph may be displayed on the screen and only the image may be displayed in the view-finder. Alternatively, the screen may be split so that a portion of the screen displays a captured image and a separate portion displays the graph. In yet another alternative, the image-capture device may be connected to an external device an one of the image-capture device and the external device may display the captured image and the other may display the graph.

Although, in FIGS. 2A to 2G, the horizontal axis of the characteristic curve denotes the shutter speed, the vertical axis denotes the iris value, and the ISO value is set as the default, the photographing conditions denoted by the axes and the default may be arbitrarily changed.

Figure 3:
FIG. 3 is a view showing a settable mode and an On-Screen Display (OSD) icon of the image photographing apparatus according to the embodiment of the present general inventive concept.
Figure 3:
Figure 3:
Figure 3:
Figure 3:
Figure 3:
Figure 3:
Figure 3:

FIG. 3 is a view illustrating a settable mode and an OSD icon of the image photographing apparatus according to an embodiment of the present general inventive concept.

The auto mode refers to a mode to minimize user control and allow the user to easily photograph an image such that the user may not arbitrarily adjust the photographing conditions. The program mode refers to a mode to set, store, and photograph various functions. The iris mode is a mode to automatically set the shutter speed according to the set iris value. The shutter mode is a photographing mode to automatically set the iris value according to the set shutter speed. The manual mode refers to a mode to allow the user to directly set the shutter speed, the iris value and the ISO value. In this case, according to the embodiment of the present general inventive concept, any point of the characteristic curve 200 shown in FIGS. 2A-2G or the periphery of the characteristic curve 200 may be specified so as to set or change the photographing conditions. The "my set" mode refers to a mode to set and store photographing conditions which are frequently used, so as to allow the photographing conditions to be used later. The scene mode refers to a mode to simply set the image photographing apparatus 10 according to the various photographing situations, such as a night scene, a person, a landscape, proximity, and character recognition. In addition, there may be a voice recording mode, a moving image mode and the like. The photographing mode of the present general inventive concept is not limited to the above-described modes.

Figure 4A:
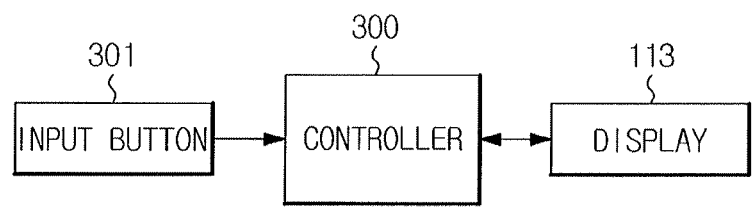
FIG. 4A is a control block diagram of the image photographing apparatus according to the embodiment of the present general inventive concept.

FIG. 4A is a control block diagram of the image photographing apparatus according to an embodiment of the present general inventive concept.

As illustrated in FIG. 4A, the image photographing apparatus 10 includes an input button 301 to allow the user to input various commands, a controller 300 to control the image photographing apparatus 10, and a display 113 to output the screen of the image photographing apparatus 10.

The input button 301 includes the menu/OK button located at the central portion thereof and the function button 109 including up, down, left and right direction buttons. The up, down, left, and right direction buttons may not only function as direction buttons, but may also function as special function buttons if the menu is displayed on the display 113. If the photographing mode of the image photographing apparatus 10 is the manual photographing mode, the user controls the input button 301 so as to select and adjust the values of the horizontal axis 202 and the vertical axis 203 of the characteristic curve 200 or the default.

The controller 300 displays the characteristic curve 200 and the recommended region 201 indicating the relationship between the photographing conditions in the manual mode on the display 113, and the characteristic curve 200 and the recommended region 201 indicating the relationship between the photographing conditions in the auto mode in a state of being dimmed.

The characteristic curve 200 refers to a curve displayed in the internal space formed by the horizontal axis 202 and the vertical axis 203, in which, with respect to the photographing condition set as the value of any one of the horizontal axis 202 or the vertical axis 203, the change in photographing condition of the other axis is two-dimensionally displayed. For example, the horizontal axis 202 of the characteristic curve 200 denotes the shutter speed and the vertical axis 203 denotes the iris value, the two-dimensional curve indicating the proper iris value according to the shutter speed is displayed on the display 113. At this time, the two-dimensional curve is displayed using the ISO value (e.g., 400) as the default value. That is, if the ISO value of the default value is 400, the characteristic curve 200 indicating the proper iris value according to the change in shutter speed is displayed. If the user controls the input button 301 or directly touches the display 113, the ISO value may be changed. If the ISO value is changed, the changed ISO value is used as the default value, the characteristic curve 200 is updated, and the updated characteristic curve 200 is displayed. The characteristic curve 200 and the recommended region 201 may be displayed superimposed on the input image of the image photographing apparatus 10. Alternatively, only one of the characteristic curve 200 and the recommended region 201 may be displayed on the display 113 at a time.

The recommended region 201 refers to a predetermined region located at the periphery of the characteristic curve 200, that is, a region which is recommended such that the image photographed by the image photographing apparatus 10 has a proper EV. The proper EV has a predetermined range of an exposure index which is changed according to various conditions such as season, weather and photographing time, and the range may be determined by a designer when a product is designed.

TABLE 1

| Shutter speed | 1/4000 | 1/2000 | 1/1000 | 1/500 |
|---|---|---|---|---|
| Iris value | f1.4 | f2 | f2.8 | f4 |

As described in Table 1, if the proper EV is obtained when the shutter speed is 1/4000 and the iris value is f1.4, the designer may set the proper EV, that is, the recommended region, using a region having an iris value of f1.2 to f1.6 with respect to the shutter speed of 1/4000 as the predetermined range of the proper EV.

The controller 300 updates the characteristic curve 200 and the recommended region 201 at a predetermined interval of time and displays them on the display 113.

When the Field of View (FOV) of the image photographing apparatus 10 is changed, the controller 300 updates the characteristic curve 200 and the recommended region 201 according to the changed FOV and displays them on the display 113.

When the screen of the image photographing apparatus 10 is changed, the controller 300 updates the characteristic curve 200 and the recommended region 201 according to the changed screen and displays them on the display 113.

When the user specifies any point of the characteristic curve 200 or the periphery of the characteristic curve 200, the controller 300 changes the photographing conditions according to the specified point.

When the user specifies any point of one of the horizontal axis 202 or the vertical axis 203 of the characteristic curve 200 in the manual mode, the controller 300 changes the point of the other axis corresponding thereto according to the characteristic curve 200.

When the user specifies any point on the characteristic curve 200 in the manual mode, the controller 300 changes the photographing conditions of the horizontal axis 202 and the vertical axis 203 of the characteristic curve 200 to the values indicated by the specified point.

When the user specifies any point in the internal space formed by the horizontal axis 202 and the vertical axis 203 of the characteristic curve 200 in the manual mode, the controller 300 changes the photographing conditions of the horizontal axis 202 and the vertical axis 203 to the values indicated by the specified point. At this time, when the user specifies any point outside the recommended region 201 of the characteristic curve 200, the EVC is additionally displayed on the display 113.

The display 113 is an OSD to display the photographing mode and state currently set in the image photographing apparatus 10, and includes a touch screen to recognize user touch. That is, the user may directly touch the display 113 so as to select and change the menu. According to the embodiment of the present general inventive concept, in the manual mode of the image photographing apparatus 10, the user may touch the display 113 so as to set the values of the horizontal axis 202 and the vertical axis 203 of the characteristic curve 200 or the default or touch any point of the characteristic curve 200 or the periphery of the characteristic curve 200 so as to change the photographing conditions.

Figure 4B:
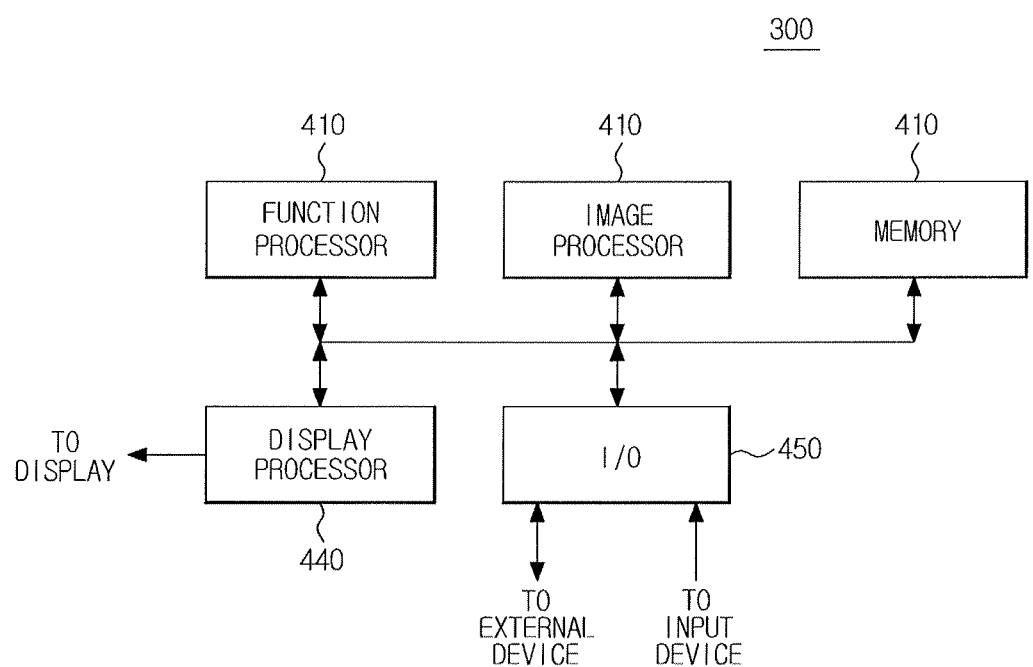
FIG. 4B is a block diagram of a controller of FIG. 4A according to an embodiment of the present general inventive concept.

FIG. 4B illustrates one embodiment of a controller 300 of FIG. 4A. The controller 300 may include one or more processors or processing units. Each processor or processing unit may comprise a combination of a physical processor, memory, and logic. For example, the controller 300 may comprise only one physical processor that accesses memory and logic to execute different processing functions. Alternatively, multiple processors may access one or more memory units or one or more logic units to execute multiple processing functions.

As illustrated in FIG. 4B, the controller 300 may include a function processor 410, an image processor 420, memory 430, a display processor 440, and an I/O unit 450. The image processor 420 may receive an image or image data from an image capture unit and may store the image in memory 430, output the image to an external device via the I/O unit 450, or may send the image to the display processor 440 to be displayed.

The I/O unit 450 may be connected to an external device and to one or more input devices, such as a touch-screen, a knob, button, or dial, or any other input device. The function processor 410 may control additional functions of the image-capture device. For example, if the image-capture device records or plays sound or video, or transmits or receives data wirelessly, the function processor 410 may control these functions. The memory 430 may be shared by various processors, or each individual processor or processing unit may have its own dedicated memory 430.

Figure 5:
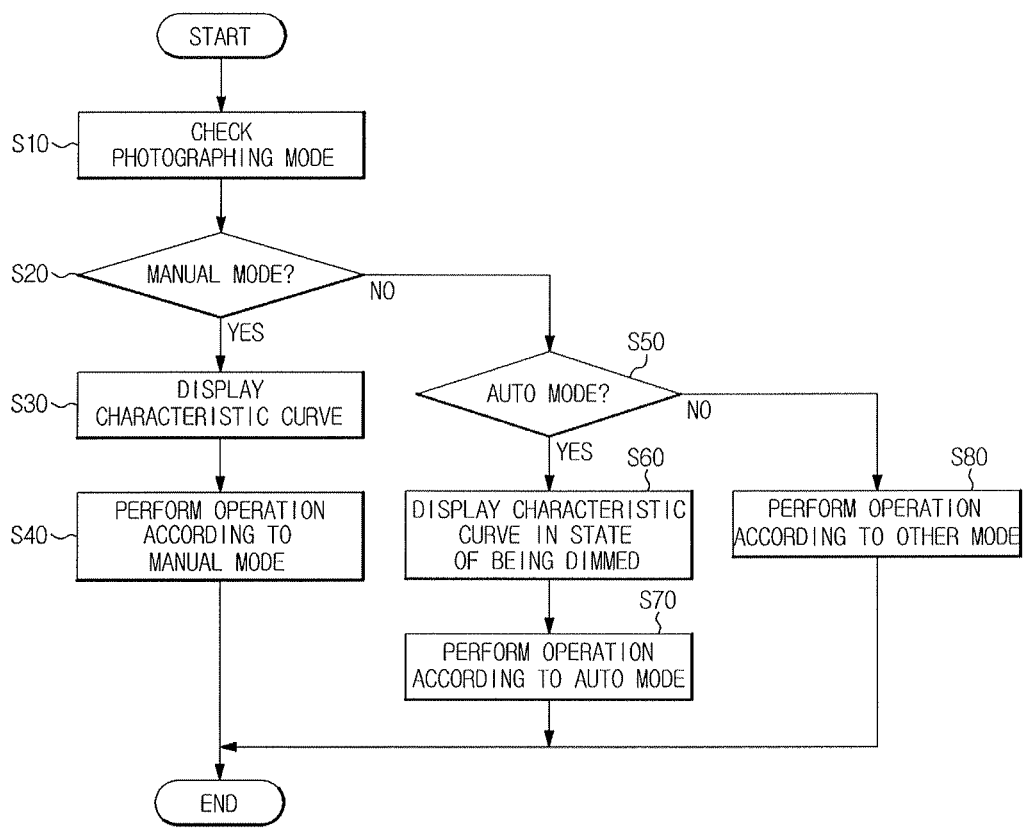
FIG. 5 is a flowchart illustrating a method of controlling an image photographing apparatus according to an embodiment of the present general inventive concept.

FIG. 5 is a flowchart illustrating a method of controlling an image photographing apparatus according to an embodiment of the present general inventive concept.

As shown in FIG. 5, the controller 300 checks the photographing mode when the operation of the image photographing apparatus 10 is started (S10).

Next, if the photographing mode of the image photographing apparatus 10 is the manual mode to allow the user to manually adjust the photographing conditions, the characteristic curve 200 is displayed on the display 113 and the operation according to the manual mode is performed (S20, S30 and S40).

In contrast, if the photographing mode of the image photographing apparatus 10 is the auto mode to prevent the user from manually changing the photographing conditions, the characteristic curve 200 is displayed on the display 113 in a state of being dimmed, and the operation according to the auto mode is performed (S50, S60 and S70).

If the photographing mode of the image photographing apparatus 10 is not the manual mode or the auto mode, the operation according to another mode, for example, the iris mode, the shutter mode or the like, is performed (S80).

Figure 6:
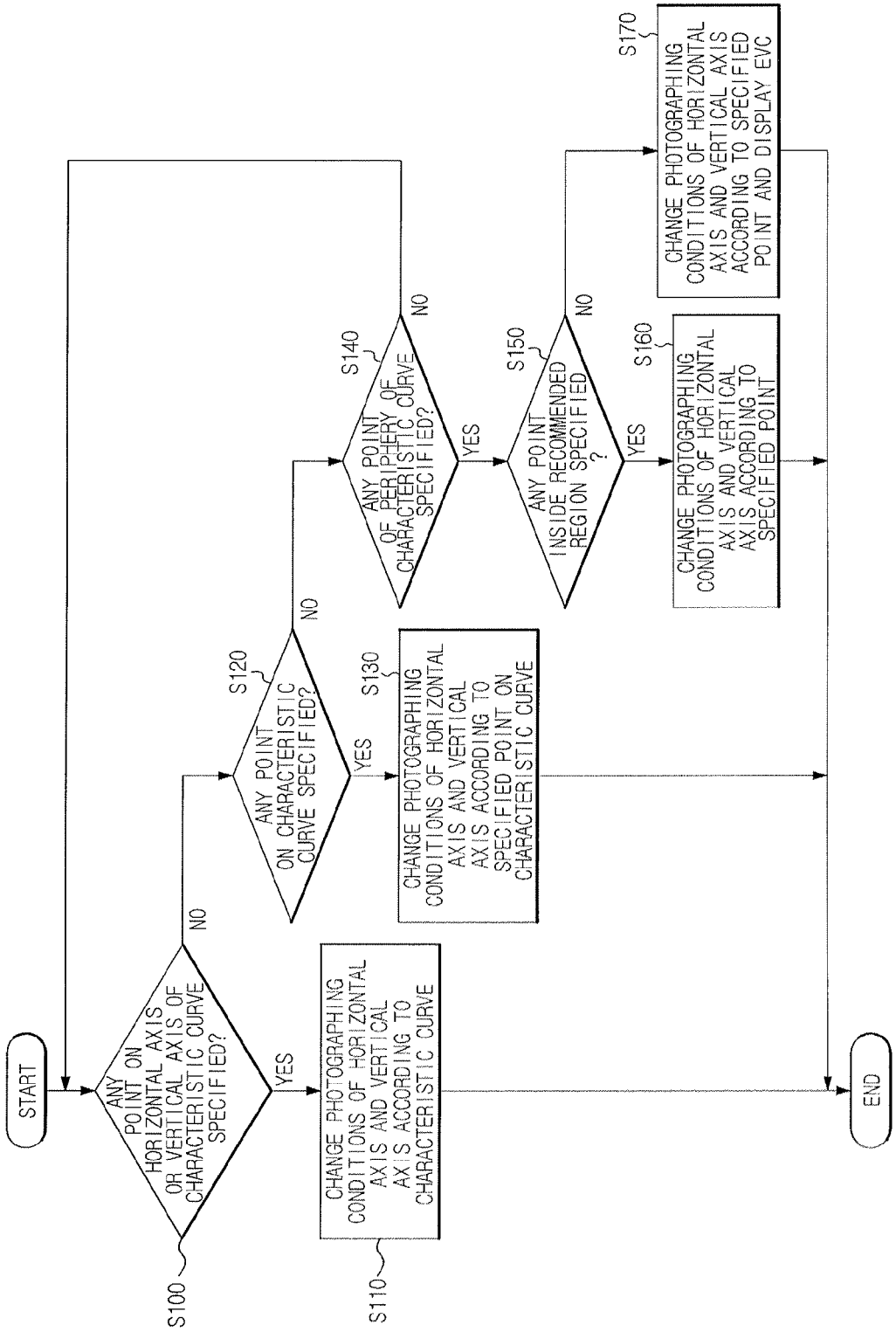
FIG. 6 is a flowchart illustrating a method of controlling an image photographing apparatus in a manual mode, according to an embodiment of the present general inventive concept.

FIG. 6 is a flowchart illustrating a method of controlling an image photographing apparatus in a manual mode, according to an embodiment of the present general inventive concept.

As shown in FIG. 6, the controller 300 displays the characteristic curve 200 on the display 113 if the photographing mode of the image photographing apparatus 10 is the manual mode, and determines whether the user specifies any point on the horizontal axis 202 or the vertical axis 203 of the characteristic curve 200 (S100).

Next, if it is determined that the user specifies any point on the horizontal axis 202 or the vertical axis 203 of the characteristic curve 200, the photographing conditions of the horizontal axis 202 and the vertical axis 203 are changed according to the characteristic curve 200. For example, when the user specifies any point on the horizontal axis 202, the photographing condition of the horizontal axis 202 is changed by the specified value and the photographing condition of the other axis which is not specified by the user is also changed according to the characteristic curve 200 (S110).

If it is determined that the user specifies any point on the characteristic curve 200, the photographing conditions of the horizontal axis 202 and the vertical axis 203 are changed according to the specified point on the characteristic curve 200 (S120 and S130).

When the user specifies any point of the periphery of the characteristic curve 200, the controller 300 determines whether the user specifies any point inside the recommended region 201 (S140 and S150).

Next, if it is determined that the user specifies any point inside the recommended region 201, the photographing conditions of the horizontal axis 202 and the vertical axis 203 are changed according to the specified point (S160).

If it is determined that the user specifies any point outside the recommended region 201, the photographing conditions of the horizontal axis 202 and the vertical axis 203 are changed according to the specified point and the EVC is additionally displayed on one side of the display 113 (S170).

Figure 7:
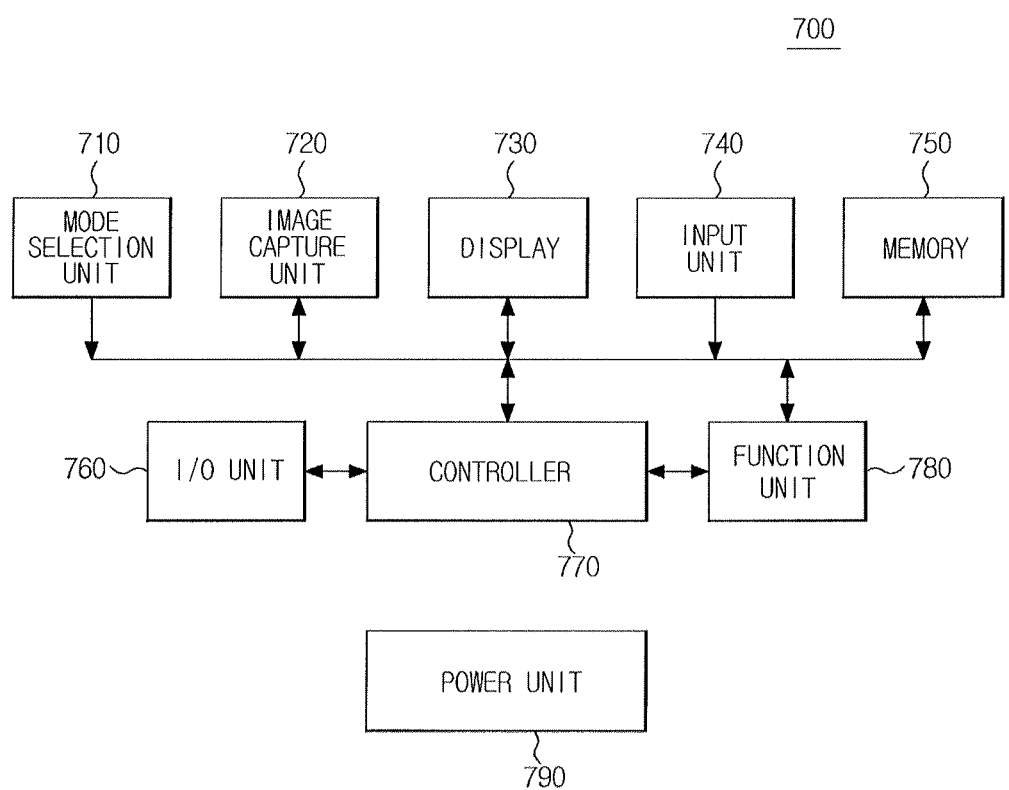
FIG. 7 is a block diagram of an image-capture apparatus according to an embodiment of the present general inventive concept.

FIG. 7 is a block diagram of functional units of an image-capture apparatus 700 according to the present general inventive concept. The image-capture apparatus may include at least a mode selection unit 710, an image-capture unit 720, a display 730, an input unit 740, a memory 750, an I/O unit 760, a controller 770, a function unit 780, and a power unit 790. Although some functional units are illustrated in FIG. 7, functional units may be added, removed, or combined depending on the desired configuration and functions of the image-capture device.

The controller 770 may include one or more processors, logic, and memory to control operation of one or more functional units. The mode selection unit 710 may include hardware to receive a mode selection from a user, such as a dial, knob, button, or electronic input. Based on the selected mode, the controller 770 may control the image capture unit 720, display 730, input unit 740, memory 750, and function unit 770.

The image-capture unit may include hardware to receive light forming an image, and to transform the receive light into electronic signals. The controller 770 may direct the electronic signals to save the image in memory 750, to display the image via the display 730, or to transmit the image to an external device via the I/O unit 760, for example. The controller 770 may also generate a user interface, such as a graph including a characteristic curve, to display on the display 730. The controller 770 may then receive a user input via the input unit 740 to adjust settings of the image-capture unit 720, as described above.

An image-capture device according to the present general inventive concept may be capture images on film or may digitally capture images. For example, an image-capture unit 720 of a digital device may not have a physical shutter or an iris to adjust, but may adjust an electronic characteristic of a digital image-capture unit, such as a photo-electric sensor and a charge coupled device (CCD), to correspond to a "shutter speed" or any other image-capture characteristic or condition. A photo-electric sensor may output a certain electric signal corresponding to an image, and a controller may adjust the electric signal to have characteristics, such as brightness, sharpness, or focus, that may correspond to physical structures such as an iris, a shutter, or a lens. Alternatively, a digital image-capture device may have a combination of physical structures, such as an iris, a shutter, and a lens and digital structures, such as a photoelectric sensor and a controller.

The function unit 670 may control any functions of the image-capture device 700 that may be unrelated to the control of the image-capture unit 720. For example, the function unit 670 may control various visual and audio display and transmission functions, data processing applications, or any other applications. The power unit 790 may provide power to each of the functional units.

Each functional unit may include any combination of processors, memory, logic units, and any other functional hardware. For example, the mode selection unit 710 or the input unit 740 may include a physical dial or button to receive a mode selection or input, and circuitry to convert a physical position of the dial or button into electrical signals and to transmit the signals to the controller 770. Likewise, the I/O unit 760 may include terminals or transceivers to connect to external devices and circuitry to process received signals or signals-to-be-transmitted, to save the signals in memory, and to transmit signals to the controller 770.

The functional units may share a single processor, a single chip or block of memory, and a single logic device, or one or more of the functional units may have a dedicated processor, memory chip, or logic device.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system.

Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

For example, a digital image-capture device may include the controller 770 to receive digital data corresponding to an image and to process the data to output and/or store the image, and memory 650 to store the image and any other programming or commands. A computer-readable medium, such as a disk, chip, or any other medium, may be used to control the controller and memory to perform the functions described above. The executable code may be transmitted to the controller 770 and memory 650 via the I/O unit 760, or may be included in a physical memory chip, such as memory 650.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A method of controlling an image photographing apparatus, the method comprising:
   determining a photographing mode of the image photographing apparatus;
   if the photographing mode is a manual mode, in response to a changed display screen, displaying a graph including an updated characteristic curve and a recommended region around the characteristic curve, the characteristic curve indicating a relationship between at least two photographing conditions based on a selected default value of a sensor of the image photographing apparatus, and the recommended region being different than an entire region of the graph;
   specifying any point on the graph; and
   changing the photographing conditions according to the specified point.

2. The method according to claim 1, wherein the recommended region indicating a photographing condition region recommended when performing a photographing operation of the image photographing apparatus is displayed at a periphery of the characteristic curve.

3. The method according to claim 2, wherein the photographing conditions include at least one of a shutter speed, an iris value, and an International Organization for Standardization (ISO) value.

4. The method according to claim 3, wherein:
   the characteristic curve includes a curve displayed in an internal space of the graph formed by a horizontal axis and a vertical axis; and
   a value of the horizontal axis or the vertical axis is set to any one of the shutter speed, the iris value or the ISO value by touching the display or controlling an input button included in the image photographing apparatus.

5. The method according to claim 4, wherein any one of the shutter speed, the iris value or the ISO value, which is not set as the value of the horizontal axis or the vertical axis, is used as a default of the characteristic curve.

6. The method according to claim 5, wherein the default is displayed on one side of the display, and is set to any value by touching the display or controlling the input button.

7. The method according to claim 4, wherein the specifying of any point on the display includes specifying any point on the horizontal axis or the vertical axis.

8. The method according to claim 7, wherein, when any point on any one of the horizontal axis or the vertical axis is specified, the photographing condition of the non-specified axis is changed according to a relationship between the photographing conditions defined by the characteristic curve.

9. The method according to claim 4, wherein the specifying of any point on the display includes specifying any point on the characteristic curve.

10. The method according to claim 9, wherein, when any point on the characteristic curve is specified, the photographing conditions of the horizontal axis and the vertical axis are changed according to the specified point.

11. The method according to claim 4, wherein the specifying of any point on the display includes specifying any point on the internal space formed by the horizontal axis and the vertical axis.

12. The method according to claim 11, wherein the photographing conditions of the horizontal axis and the vertical axis are changed according to the point specified on the internal space.

13. The method according to claim 11, wherein, when the point specified on the internal space is outside the recommended region, an Exposure Value Compensation (EVC) is displayed on the display.

14. The method according to claim 1, wherein the characteristic curve is updated and displayed at a predetermined interval of time.

15. The method according to claim 1, wherein the characteristic curve is updated and displayed when a screen photographed by the image photographing apparatus is changed.

16. The method according to claim 15, wherein the changing of the screen includes changing a Field of View (FOV) of the image photographing apparatus or changing a scene photographed by the image photographing apparatus.

17. An image photographing apparatus comprising:
   a display to display a graph, in response to a changed display screen, including an updated characteristic curve and a recommended region around the characteristic curve, the characteristic curve indicating a relationship between photographing conditions based on a selected default value of a sensor of the image photographing apparatus, and the recommended region being different than an entire region of the graph; and
   a controller to change the photographing conditions according to the specified point when any point on the graph is specified.

18. The image photographing apparatus according to claim 17, wherein the display updates and displays the characteristic curve at a predetermined interval of time.

19. The image photographing apparatus according to claim 17, wherein the display updates and displays the characteristic curve when a screen photographed by the image photographing apparatus is changed.

20. The image photographing apparatus according to claim 19, wherein the changing of the screen includes changing of a Field of View (FOV) of the image photographing apparatus or changing of a scene photographed by the image photographing apparatus.

21. The image photographing apparatus according to claim 17, wherein the display displays the characteristic curve superimposed on a screen photographed by the image photographing apparatus.

22. The image photographing apparatus according to claim 17, wherein the display includes a touch screen to allow a user to touch a screen to input a command to specify the point on the graph.

23. The image photographing apparatus according to claim 17, wherein the photographing conditions include a shutter speed, an iris value or an International Organization for Standardization (ISO) value.

24. The image photographing apparatus according to claim 23, wherein:
the characteristic curve includes a curve displayed in an internal space formed by a horizontal axis and a vertical axis; and
a value of the horizontal axis or the vertical axis is set to any one of the shutter speed, the iris value or the ISO value.

25. The image photographing apparatus according to claim 24, wherein, when any point on the horizontal axis or the vertical axis is specified, the controller also changes the photographing condition of the non-specified axis according to the characteristic curve.

26. The image photographing apparatus according to claim 24, wherein a recommended region indicating a photographing condition region recommended when performing a photographing operation of the image photographing apparatus is displayed at the periphery of the characteristic curve.

27. The image photographing apparatus according to claim 26, wherein, when any point on the characteristic curve is specified, the controller changes the photographing conditions of the horizontal axis and the vertical axis according to the specified point.

28. The image photographing apparatus according to claim 26, wherein, when any point of the periphery of the characteristic curve is specified, the controller changes the photographing conditions of the horizontal axis and the vertical axis according to the specified point.

29. The image photographing apparatus according to claim 26, wherein, when any point outside the recommended region is specified, the controller displays an Exposure Value Compensation (EVC) on the display.

30. The image photographing apparatus according to claim 17, further comprising an input button to specify any point on the display or input a command to the controller.

31. A non-transitory computer-readable medium having stored code to execute a method, the method comprising:
displaying a graph, in response to a changed display screen, including an updated characteristic curve and a recommended region around the characteristic curve, the recommended region being different than an entire region of the graph, and the characteristic curve representing a relationship between at least two image-capture characteristics based on a selected default value of a sensor of the image photographing apparatus, at least one of the image-capture characteristics being adjusted in response to a user input corresponding to a location on the graph.

* * * * *